United States Patent Office 3,574,607
Patented Apr. 13, 1971

3,574,607
ALUMINUM-COPPER-MERCURY COMPLEX AND METHODS FOR PRODUCING THE SAME
George G. Merkl, 517 Boulevard,
New Milford, N.J. 07646
No Drawing. Continuation-in-part of abandoned application Ser. No. 672,438, Oct. 3, 1967. This application Apr. 17, 1969, Ser. No. 828,057
Int. Cl. C22c 7/00
U.S. Cl. 75—134                                27 Claims

ABSTRACT OF THE DISCLOSURE

A stable, electrically conductive, chemically bonded complex of aluminum-mercury and copper alone or in combination with any one or more of tin, cadmium, zinc, iron, silver and lead and methods for producing the same. This is a continuation-in-part of U.S. patent application Ser. No. 672,438, filed Oct. 3, 1967, now abandoned.

BACKGROUND OF INVENTION

Heretofore, it has been impossible to chemically bond metallic aluminum to metallic mercury. Aluminum-mercury amalgams are known and comprise the physical combination of mercury and aluminum without chemically bonding. The physical combination of an amalgam is in the nature of a solution wherein the aluminum and mercury are mutually dissolved in each other. Such aluminum-mercury amalgams are reasonably soft for a very short period of time but quickly freeze to a dry powder which is of little or no value and which exhibits a high degree of oxidation.

A true chemically bonded complex of aluminum, mercury and copper is possible by employing the methods described herein. Such a true chemical complex is stable, highly resistant to oxidation, contains a high density of surface hydrogen ions which tend to create a surface reduction condition and is electrically conductive. By varying the relative amounts of mercury, copper and aluminum, the physical characteristics of a complex may range from an extremely soft, readily deformable mass at temperatures well below zero degrees centigrade to a relatively hard solid at room temperatures and above.

If certain other metals are included in the complex, a wide variety of different characteristics may be achieved. Merely, by way of illustration, the melting point of the complex may be varied selectively from approximately −80° F. to approximately 2000° F. Moreover, both viscosity and cohesion may be varied selectively through wide ranges. The addition of iron imparts magnetic properties.

The electrical conductivity of the complex is on the order of silver. In addition, the complex is extremely resistant to oxidation or chemical decomposition even at the extremely high temperatures of an electrical arc. As a result, the complex is extremely useful as an electrical contact medium being virtually immune to damage by arcing or excessively high current densities.

Among the other interesting properties of the complex is that of penetration into other materials such as aluminum, copper, brass, bronze, iron and the like. By penetrating such other materials with the complex in its various forms, the physical and chemical characteristics of the penetrated product may be varied through wide ranges.

The complex may also be employed to plate various other materials since the complex may be provided in a soft, deformable low-cohesive penetrable form. Merely by way of illustration, the complex including lead as an added metal may be plated on various materials including metals, plastics or other synthetics and the like to provide an extremely dense radiation shield having radiation absorbing qualities greater than lead along.

The complex has many other uses in its many and varied forms which are not catalogued herein. The uses recited above are merely by way of illustration and are not intented in limitation of the claims presented herewith.

SUMMARY OF INVENTION

A composition of matter comprising a chemical complex of aluminum, mercury and copper in which the copper and aluminum appear in relative molar ratios of copper to aluminum no less than approximately 1:1 and nor more than approximately 2:1, and, in which, the mercury appears in quantities of approximately 10% to 50% of the combined weight of aluminum, copper and mercury; the complex including optionally alloying metals selected from the group consisting of tin, cadmium, zinc, iron, silver and lead in quantities just sufficient to produce desired characteristics.

The invention also includes methods for producing the complex aforesaid comprising preparing a solution of copper chloride and hydrochloric acid, adding aluminum to the solution in relative molar quantities of copper to aluminum of no less than approximately 1:1 and no greater than approximately 2:1; optionally dissolving desired quantities of alloying metals in the resultant solution selected from the group consisting of tin, cadmium, zinc, iron, lead and silver and the chlorides thereof; vigorously agitating the aluminum in the said solution until sufficiently consumed and replaced by a sponge complex of copper and aluminum; adding liquid mercury to the sponge complex of copper and aluminum in quantities of approximately 10% to 50% by weight of the combined aluminum, copper and mercury while vigorously agitating the reacting mass until the reaction goes to substantial completion.

PREFERRED EMBODIMENT OF INVENTION

The objects and advantages aforesaid as well as other objects and advantages may be achieved by the aluminum-copper-mercury complex and methods for producing the same hereinafter described.

METHOD FOR PRODUCING COMPLEX (1) Preparation of solution of hydrochloric acid and copper chloride The initial step in the preparation of the aluminu-copper-mercury complex includes the preparation of a solution of hydrochloric acid and copper chloride. Fundamentally, the object of this first step is to provide an acid solution containing copper ions. Hydrochloric acid is employed as the acid solvent because it is relatively stable, economical, easily handled and considerably less toxic than other acid halides such as hydrofluoric acid, hydrobromic acid or hydroiodic acid. In addition, copper chloride is employed as the initial carrier of copper since it is readily soluble in hydrochloric acid, relatively inexpensive and easily handled. Nevertheless, other halides of copper may be employed so long as the copper halide and acid are mutually compatible and the copper halide is soluble in the acid. These other halides must be considered the equivalent of the chlorides recited in the claims herein.

The hydrochloric acid must be relatively pure particularly with respect to the inclusion of sulfates such as sulfuric acid since sulfates poison the reaction by generating sulphur dioxide which oxidizes aluminum that is introduced into the reaction thereafter.

It is preferable to substantially saturate the hydrochloric acid with copper chloride by using approximately equal volumes of each. If an excess of copper chloride is employed resulting in super-saturation, the copper chloride tends to reduce to copper oxide which is undesirable. The use of substantially less than a saturated solution merely results in fewer copper ions than are desirable in steps to be hereinafter described. If there is an insufficiency of copper ions below a critical value, a powdery final product which is easily oxidized results.

Preferably, the hydrochloric acid should be a two normal solution or stronger. Weaker solutions of hydrochloric acid do not provide sufficient copper ions in the reaction mass tending to produce the conditions described above with respect to insufficient copper ions.

The copper chloride is added as a solid to the liquid solution of hydrochloric acid and dissolved therein by agitation. Nevertheless, any suitable mixing procedure is acceptable to produce the solution of copper chloride in hydrochloric acid.

The total quantity of copper chloride and hydrochloric acid is optional at this point in the procedure and is determined by the amount of final product desired.

(2) Addition of aluminum to copper chloride solution of hydrochloric acid

The second step in the process includes the addition of metallic aluminum to the solution of copper chloride and hydrochloric acid to produce an aluminum-copper complex which appears as a bronze-colored sponge.

It is preferable that the aluminum be as pure as possible although not critical to the reaction itself. Aluminum commonly includes impurities of both copper and magnesium. Some or all of the copper impurity may go into solution and thereafter react with the aluminum but the magnesium does not tend to alloy. As a practical matter, aluminum is readily available in purities up to 2% magnesium and 5% copper which is quite acceptable for the process described herein.

Stoichiometrically, the copper and aluminum should appear in molar ratios of copper to aluminum of approximately no less than 1:1 and approximately no greater than 2:1. If there is a stoichiometric deficit of copper below the desiderata set forth above, the final product appears as a nearly dry powder which is easily oxidizable and has little or no value. If there is a stoichiometric excess of copper above the desiderata set forth above, insufficient quantities of mercury enter into the complex because of the apparent excessive saturation of available aluminum bonds.

The stoichiometry of the reaction is intimately associated with reaction mechanics. The reaction between metallic aluminum and the copper chloride solution of hydrochloric acid occurs at the surface of the aluminum to generate a bronze-appearing sponge. Unless the aluminum is agitated vigorously in such a manner as to dislodge the aluminum-copper complex from the surface of the metallic aluminum, the reaction tends to attenuate and a portion of the aluminum remains in the reaction mass unreacted. After the addition of mercury, this unreacted aluminum tends to re-react generating hydrogen gas in the mass of the final product, which for many purposes is undesirable although there may be some uses for a mass which generates hydrogen gas. Nevertheless, for purposes set forth above, such as an electrical contact media, no metallic aluminum unreacted with the copper should remain in the final product.

It has been found that it is most expeditious to add the aluminum as a solid member which is inserted into the copper chloride solution of hydrochloric acid and vigorously stirred. The reaction proceeds rapidly at the surface of the aluminum; however, the mechanical agitation of the aluminum bar or rod about the reaction mass quickly removes the aluminum-copper complex from the surface of the rod or bar to permit the reaction to go to completion without the introduction of solid, unreacted aluminum into the reaction mass. While this mechanical procedure is quite satisfactory to insure complete reaction of the aluminum and to prevent the inclusion of solid, unreacted aluminum, it generates difficulties of maintaining precise control over the stoichiometric quantity of aluminum added with respect to copper since it is difficult to mechanically measure the precise weight of aluminum being added since a portion of the aluminum rod or bar functions as a stirring handle and never engages the reacting mass.

Nevertheless, to the trained observer, the approximate molar ratio of aluminum to copper may be observed visually. Within a short period of time, almost the entire copper chloride solutions turns to a bronze-like sponge. The drier the bronze-like sponge, the greater the molar ratio of aluminum to copper. Thus, by withdrawing the aluminum bar from the reacting mass in time, the relative molar ratio of copper to aluminum as set forth above may be maintained within the desired range with reasonable ease.

If precise control over the relative molar ratio of aluminum to copper is to be maintained, a weighed quantity of aluminum may be added in the form of relatively large particles or chunks. Nevertheless, it is necessary to mechanically agitate the reacting mass with sufficient efficiency to completely react all of the aluminum within a relatively short period of time for if the time is excessively protracted, the bronze-like aluminum-copper complex tends to oxidize. If any of the aluminum remains unreacted, hydrogen gas is generated.

Aluminum powder may be employed rather than large particles. However, the use of aluminum powder generates problems of reaction control since the reaction tends to proceed at a nearly explosively rapid rate. Therefore, as a practical matter, in order to reduce the hazard of explosion, aluminum powder should be avoided.

Merely by way of illustration and without intending to limit the scope of the claims appended thereto, laboratory quantities of copper chloride solution of hydrochloric acid react to produce the proper amount of aluminum-copper complex in less than five minutes and frequently in approximately one-half to one minute. When the proper amount of aluminum has formed a complex with copper, little or no liquid solution of hydrochloric acid and copper chloride is apparent to the eye and the entire reacting mass appears as a bronze-appearing sponge, the drier the sponge, the greater the relative quantity of aluminum.

If the aluminum-copper sponge is permitted to sit for excessive periods of time, it spontaneously converts to a white powder believed to be a complex salt of aluminum and copper. This salt has unusual characteristics and is valuable for other purposes not catalogued herein.

(3) The addition of liquid mercury to the aluminum-copper complex

The next basic step in the reaction includes the addition of liquid mercury to the aluminum-copper sponge produced by the steps set forth above before that sponge converts to the white powder complex salt. The relative quantity of mercury to aluminum and copper may be varied within the wide range depending upon the purposes to which the final product is to be put. Preferably, the mercury should be added in quantities of approximately 10% to 50% of the combined weight of aluminum, copper and mercury.

As a generalization, it may be said that the greater the relative quantity of mercury to aluminum and copper, the softer the final product and, conversely, the less the relative quantity of mercury, the harder the product.

Quantities of mercury less than approximately 10% of the combined weight of aluminum, copper and mercury result in a product which is so dry that it lacks cohesion and tends to break up as a powder. If the mercury appears in quantities of greater than approximately 50% of the combined weight of aluminum, copper and mercury, the product tends to include uncomplexed liquid mercury which may be squeezed out by mechanical means. However, the excess liquid mercury will not produce a freezing or solidifying amalgam with the aluminum as is characteristic of mercury-aluminum amalgam.

The mercury is added as a liquid to the aluminum-copper sponge and vigorously agitated. Preferably, agitation is by means of an aluminum rod which eliminates the danger of including impurities in the final product attendant by the use of a mechanical stirrer as fabricated of other materials. The same aluminum rod employed to introduce the aluminum into the hydrochloric acid solution of copper chloride may be employed.

As the aluminum is added to the apparently relative dry sponge complex of aluminum and copper, water immediately appears in substantial quantities. The mercury immediately bonds to the aluminum-copper complex to form the final product which falls to the bottom of the reacting mass, the water floating on top. The reaction tends to go to completion in ten to fifteen minutes when employing laboratory quantities and is self-limiting. The water above the final product may be decanted after termination of the reaction.

In addition, the final product may be washed with two normal hydrochloric acid which tends to leach any acid soluble impurities removing them from the final product.

REACTION DYNAMICS

The precise reaction dynamics have not been determined. However, one may speculate with reasonable confidence that the addition of aluminum to the copper-chloride solution of hydrochloric acid removes electrons from the aluminum atoms. During the course of this reaction, hydrogen gas is liberated which is to be expected under commonly accepted principles of chemical reactions. The aluminum-copper sponge is in all probability an aluminum-copper complex which may or may not include chloride ions. However, of far greater importance, it is presently believed and may be reasonably postulated that the aluminum-copper sponge complex includes direct bonds between the aluminum and copper as well as direct bonds between or among the aluminum and copper and hydrogen ions. It is believed that the hydrogen bonds which exist in the aluminum-copper sponge complex produce covalent bonds between and among aluminum, copper and mercury after the addition of mercury by the displacement of hydrogen. The displaced hydrogen appears in the form of water. In addition, hydrogen gas is generated in large quantities. Nevertheless, some of the water may have derived from the original hydrochloric acid solution although no free liquid is apparent in the aluminum-copper sponge.

It is believed that the hydrogen ions bonded to the aluminum-copper sponge are exchanged for mercury ions upon the addition of liquid mercury, the hydrogen ions being released as hydrogen gas or reacting with hydroxyl radicals to form water. This would explain the rapid generation of water after the addition of mercury to the aluminum-copper sponge. Since no chloride ion appears in the final product, such chloride ions if any which are attached to the aluminum-copper intermediate complex, are released by the addition of mercury bond are removed with the water.

It is manifestly evident that there are true covalent bonds between and among the aluminum, copper, mercury complex rather than a mere physical solution as exists in amalgams. The final product is stable and free-mercury cannot be forced out by mechanical means nor will free-mercury separate with the passage of time when added within the quantitative limitations set forth above. Even in the presence of extremely high temperatures such as ionizing arcs, little or no mercury vapor is released. Moreover, the final product complex appears to be rich in reducing hydrogen attached to the complex itself since any oxides which may form on the surface of the final product at extremely high arcing temperatures rapidly reduces to the complex. Still further, when the final product is contacted to other oxides, the oxides are reduced apparently by the presence of reducing hydrogen in the complex.

THE ADDITION OF COMPLEXING METALS

The physical and chemical properties of the final product may be varied within wide ranges by the addition of quantities of one or more complexing metals selected from the group consisting of tin, cadmium, zinc, iron, silver and lead. These complexing metals can be added as halide salts, preferably the chloride when employing copper chloride in the copper chloride solution of hydrochloric acid or as the pure metal. The halide salts of the complexing metals or the metals themselves are added directly to the copper chloride solution of hydrochloric acid and rapidly dissolve releasing ions of the complexing metals.

The alloying metals alter such characteristics of the final product as melting point, freezing point, cohesion, adhesion, magnetic permeability, paramagnetism, radiation absorption electrical conductivity and the like.

In Table 1, annexed hereto, the formula and characteristics of some of the more common permutations of the base complex are set forth. This table is not intended in limitation to the claims set forth herein but is merely presented for illustrative purposes.

In the chart, all percentages are set forth by weight of the final product. Nevertheless, the relative molar ratio of aluminum to copper as set forth above, should be maintained.

The basic relatively soft, putty-like final product complex including aluminum, copper and mercury has freezing point of approximately —65° F. However, by the addition of one or any combination of complexing metals selected from the group consisting of tin, cadmium and zinc can increase the melting point of the complex to 110° F. to 200° F. The complex appears as a high strength solid at temperatures below the melting point. This material is highly useful as an electrical fuse.

Still higher melting points may be obtained by adding any one or more of complexing metals selected from the group consisting of tin, cadmium, zinc and iron, the melting point rising to 1500° F. to 2000° F. The final product complex is extremely hard and dense.

Magnetic permeability and paramagnetism may be imparted to the complex by the addition of iron or iron and zinc.

Both cohesion and viscosity may be enormously enhanced by the addition of tin in the proper relative quantities. However, cohesion can be considerably diminished by altering the amount of tin.

The addition of any one or more of tin, cadmium, zinc and lead can produce a complex which is extremely opaque to a wide variety of electromagnetic or nuclear radiation.

A soft plating material rich in reducing hydrogen ions may be formed by the addition of one or more of tin, cadmium, zinc and silver.

Obviously, the total number of permutations of the base material and complexing metals is nearly infinite. One need merely observe the basic characteristics and effects of varying the relative quantities of the basic constituents of the complex, aluminum, copper and mercury, and addition of given quantities of complexing metals to produce a final product with any desired chemical or physical characteristic.

While tin, cadmium, zinc, iron, silver and lead may be added as either or both a halide salt or the solid metal, additional copper and aluminum may be added to the basic process either as the halide salt or the solid metal.

If the solid metal of any one of the aforesaid addition metals is added to the basic process, the final product tends generally to be more hard and have a higher melting point then when no addition metals are included or the addition metals or included as the halide salt.

EXAMPLES

The following examples are presented merely by way of illustration and without intending to limit the scope of the claims thereby. Basically, a large number of examples may be derived from a single basic process including the following steps:

(1) One quarter of a pound of a halide selected from the group consisting of copper chloride, zinc chloride, cadmium chloride, iron chloride, silver chloride, tin chloride and aluminum chloride having no less than approximately one-eighth of a pound of copper chloride is added to approximately 1.2 normal hydrochloric acid and agitated to dissolution.

(2) Optionally, and simultaneously, approximately one-eighth of a pound of finely divided metallic zinc, cadmium, copper, iron, silver, tin and lead may be added to the hydrochloric acid solution either in addition to the halide or in substitution thereof except for the copper chloride. The total quantity of halide and metallic powder, except for copper chloride, amounts to approximately nor more than one-eighth of a pound. The solution is stirred to dissolution.

(3) An aluminum bar having a generally rectangular cross-sectional configuration one inch on a side and sufficiently long to function as a stirring rod is introduced into the solution produced as above and rapidly stirred until a bronze appearing sponge complex appears in substantial quantities and until little or no free liquid is visible to the eye.

(4) One-half to one pound of liquid mercury is added to the sponge complex while continuing to stir with the aluminum rod until the reaction generated thereby terminates. Termination occurs when no further hydrogen gas is generated and a layer of water appears on the surface of the final product.

(5) Optionally but preferably the final product is washed with hydrochloric acid and water to leach undesirable impurities.

Merely for the purpose of a specific example, a final product including tin and cadmium as addition metals which has a relatively low melting point of minus 80° F. may be produced by the following procedure:

(1) One-eighth of a pound of copper chloride and one-eighth of a pound of cadmium chloride are added to one pint of two normal hydrochloric acid and stirred to dissolution.

(2) An aluminum rod of generally rectangular cross-sectional configuration one inch on a side and long enough to function as a stirring rod is introduced into the hydrochloric acid solution and agitated until the bronze appearing sponge substantially occupies the space previously occupied by the hydrochloric acid and little or no liquid is apparent to the naked eye.

(3) One-half to one pound of liquid mercury is added to the sponge complex while continuing to stir with the aluminum rod until the generation of hydrogen gas terminates.

(4) The liquid appearing on top of the final product is decanted and the final product is washed with hydrochloric acid and water.

NOMENCLATURE

As used herein, the following terms shall have the following definitions:

(1) Copper chloride refers to cupric chloride ($CuCl_2$) whether or not hydrated.

(2) Zinc chloride refers to $ZnCl_2$.

(3) Cadmium chloride refers to $CdCl_2$ whether or not hydrated.

(4) Iron chloride refers to ferric chloride whether or not hydrated.

(5) Aluminum chloride refers to $AlCl_3$ whether or not hydrated.

(6) Silver chloride refers to $AgCl$.

(7) Tin chloride refers to stannous chloride whether or not hydrated.

(8) Lead chloride refers to $PbCl_2$ or $PbCl_4$.

Although the above nomenclature is employed for the purposes of examples given above, it should not be interpreted as a limitation on the scope of equivalents. For instance, any compatible halide of the metals in question may be employed with the exception that cuprous chloride ($Cu_2Cl_2$) has been found unsatisfactory and chloride ($CuCl_2$) is preferred.

The foregoing description is merely intended to illustrate an embodiment of the invention. The components parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

TABLE NO. 1

| Final product | Al | Percent | | | | | | | | Characteristics |
|---|---|---|---|---|---|---|---|---|---|---|
| | | Cu | Hg | Sn | Cd | Zn | Fe | Ag | Pb | |
| Basic-electrical conductor. | Molar ratio Cu: Al 1:1–2:1. | 20–40 | 30–50 | | | | | | | Soft putty. |
| Medium soft-high Cohesion. | do | 15–30 | 25–40 | 15–30 | | | | | | High cohesion and viscosity, 80/+800 putty. |
| Medium soft-penetrator. | do | 20–40 | 30–40 | | 15–30 | | | | | Medium cohesion, −60–1,000 putty. |
| Magnetic-Soft | do | 15–30 | 30–40 | 10–20 | | | 10–20 | | | High viscosity, low cohesion, magnetic. |
| Do | do | 15–20 | 30–40 | | | 15–20 | 15–20 | | 15–20 | Soft putty, short wave wave rod shielding. |
| Radiation shield-soft. | do | 15–20 | 30–40 | ¹15–20 | ¹15–20 | ¹15–20 | | | ¹15–20 | Melting point 110° F.–200° F., high strength. |
| Solid-medium melting point. | do | 20–40 | 5–20 | ¹20–60 | ¹20–60 | ¹20–60 | ¹20–60 | | | Melting point 1,500° C.–2,000° C., 7–12.4 grm./cc. Extremely hard. |
| Solid-high melting point. | do | 10–20 | 30–50 | ¹15–30 | ¹15–30 | ¹15–30 | ¹15–30 | | | |
| Soft plating | do | 15–30 | 25–40 | ¹15–20 | ¹15–20 | ¹15–20 | | ¹15–20 | | Soft putty, rich in H+. |

¹ Select.

I claim:

1. A composition of matter consisting essentially of the product resulting from,
    (a) adding aluminum to a solution of hydrochloric acid and copper ions, until a solid complex of copper and aluminum appears having a molar ratio of copper to aluminum of no less than approximately 1:1 and no greater than approximately 2:1,
    (b) adding liquid mercury to the complex of copper and aluminum in quantities of approximately 5% to 50% by weight of the combined aluminum, copper and mercury and mixing until the reaction goes to completion.

2. A composition of matter consisting, essentially of:
    (a) the product resulting from the process set forth in claim 1 in which,
    (b) the solution of hydrochloric acid and copper ions is produced by mixing hydrochloric acid with a halide of copper.

3. A composition of matter consisting essentially of:
    (a) the product resulting from the process set forth in claim 1 in which, (b) the aluminum is added to the said solution in the form of an aluminum stirring member inserted into the solution and vigorously agitated therein until the said molar ratio of copper to aluminum is produced.

4. A composition of matter consisting essentially of:
(a) the product resulting from the process set forth in claim 1 in which,
(b) the hydrochloric acid is approximately two-normal strength.

5. A composition of matter consisting essentially of:
(a) the product resulting from the process set forth in claim 1 in which,
(b) the said hydrochloric acid solution contains ions of at least one alloying metal selected from the group consisting of tin, cadmium, zinc, iron, silver and lead in quantities just sufficient to produce desired characteristics in the final complex.

6. A composition of matter consisting essentially of:
(a) the product resulting from the process set forth in claim 1 and,
(b) adding to the said hydrochloric acid solution a halide of an alloying metal selected from the group consisting of tin, cadmium, zinc, iron, silver and lead in quantities just sufficient to produce desired characteristics in the final complex.

7. A composition of matter consisting essentially of:
(a) the product resulting from the process set forth in claim 6, in which,
(b) the said halide is the chloride.

8. A composition of matter consisting essentially of:
(a) the product resulting from the process set forth in claim 10 and,
(b) adding to the said hydrochloric acid solution in metallic form, at least one alloying metal selected from the group consisting of tin, cadmium, zinc, iron, silver and lead in quantities just sufficient to produce desired characteristics of the final complex.

9. A composition of matter consisting essentially of:
(a) the product resulting from the process set forth in claim 10, in which,
(b) the hydrochloric acid is substantially free of sulphur contaminants.

10. A composition of matter consisting essentially of:
(a) the product resulting from the process set forth in claim 1 in which,
(b) the said hydrochloric acid solution is substantially saturated with a halide salt of copper.

11. A composition of matter consisting essentially of:
(a) the product resulting from the process set forth in claim 10 in which the halide of copper is cupric chloride.

12. A composition of matter consisting essentially of:
(a) the product resulting from the process as set forth in claim 1, and,
(b) dissolving tin chloride in the said hydrochloric acid solution in quantities just sufficient to produce a final complex having approximately 15% to 30% tin by weight of the said final complex.

13. A composition of matter consisting essentially of:
(a) the product resulting from the process set forth in claim 1, and,
(b) dissolving cadmium chloride in the said hydrochloric acid solution in quantities just sufficient to produce a final complex having approximately 15% to 30% cadmium by weight of the said final complex.

14. A composition of matter consisting essentially of:
(a) the product resulting from the process set forth in claim 1, and,
(b) dissolving tin chloride and ferric chloride in the said hydrochloric acid solution each in quantities just sufficient to produce a final complex having approximately 10% to 20% tin and 10% to 20% iron by weight of the said final complex.

15. A composition of matter consisting essentially of:
(a) the product resulting from the process set forth in claim 1, and,
(b) dissolving zinc chloride and ferric chloride in the hydrochloric acid solution in quantities just sufficient to produce a final complex having approximately 15% to 20% each of zinc and iron by weight of the said final complex.

16. A composition of matter consisting essentially of
(a) the product resulting from the process set forth in claim 1, and,
(b) dissolving in the said hydrochloric acid solution, at least one salt of an alloying metal, selected from the group consisting of stannous chloride, cadmium chloride, zinc chloride and lead chloride each in quantities just sufficient to produce a final complex having approximately 15% to 20% by weight of the said final complex collectively of the said alloying metals.

17. A composition of matter consisting essentially of:
(a) the product resulting from the process set forth in claim 1, and,
(b) dissolving in the said hydrochloric acid solution, a salt of an alloying metal selected from the group consisting of stannous chloride, cadmium chloride, zinc chloride and ferric chloride in quantities just sufficient to produce a final product complex having approximately 20% to 60% by weight of the said final complex collectively of the selected alloying metals.

18. A composition of matter consisting essentially of,
(a) the product resulting from the process set forth in claim 1, and,
(b) dissolving in the said hydrochloric acid solution at least one of a salt of an alloying metal selected from the group consisting of stannous chloride, cadmium chloride, zinc chloride and ferric chloride in quantities just sufficient to produce a final complex having approximately 15% to 30% by weight of the said final complex collectively of the selected alloying metals.

19. A composition of matter consisting essentially of:
(a) the product resulting from the process set forth in claim 1, and,
(b) dissolving in the said hydrochloric acid solution, at least one salt of an alloying metal selected from the group consisting of stannous chloride, cadmium chloride, zinc chloride and silver chloride in quantities just sufficient to produce a final complex having approximately 15% to 20% by weight of the said final complex collectively of the selected alloying metals.

20. A composition of matter consisting essentially of the product resulting from,
(a) dissolving in at least approximately two-normal hydrochloric acid, cupric chloride and at least one salt of an alloying metal selected from the group consisting of the halides of tin, cadmium, zinc, iron, silver and lead, in relative quantities of approximately one pint of hydrochloric acid to ⅛ to ¼ pounds of cupric chloride and up to ⅛ pound of the said salt, the total quantity of cupric chloride and the said salt not exceeding approximately ¼ of a pound,
(b) introducing aluminum into the hydrochloric acid solution in sufficient quantities and with sufficient agitation to produce a substantially homogeneous, sponge-like reaction product substantially free of visible free liquid,
(c) adding to the said reaction product, approximately 0.5 to 1.0 pound of mercury and mixing thoroughly until the generation of gas substantially terminates.

21. A composition of matter consisting essentially of,
(a) the product produced by the process set forth in claim 20, in which,
(b) the said salt is the chloride of the alloying metal.

22. A composition of matter consisting essentially of, (a) the product produced by the process set forth in claim 21, in which,
(b) cupric chloride appears in relative quantities of approximately ⅛ of a pound and the chloride of the alloying metal appears collectively in the amount of approximately ⅛ of a pound.

23. A composition of matter consisting essentially of,
(a) the product resulting from the process set forth in claim 21 and,
(b) adding to the hydrochloric acid up to approximately one pound of an alloying metal, as the metal selected from the group consisting of tin, cadmium, zinc, iron, silver and lead.

24. A composition of matter consisting essentially of,
(a) the product resulting from the process set forth in claim 23 in which,
(b) the salt of the alloying metal is the chloride.

25. A method for complexing aluminum and mercury comprising,
(a) dissolving cupric chloride in a solution of at least approximately two normal hydrochloric acid,
(b) adding aluminum to the resulting solution while vigorously agitating the aluminum until a sponge-like reaction product appears and,
(c) thoroughly mixing mercury with the said reaction product.

26. A method for complexing aluminum and mercury comprising,
(a) the procedure in accordance with claim 25 in which,
(b) the molar ratio of copper to aluminum in the reactio product is no less than approximately 1:1.

27. A method for complexing aluminum and mercury comprising,
(a) the procedure in accordance with claim 26 in which,
(b) the molar ratio of copper to aluminum is no greater than approximately 2:1.

References Cited

UNITED STATES PATENTS 547,824   10/1895   Vigneron ---------- 75—169X

OTHER REFERENCES

L. Kahlenberg and J. A. Montgomery: "The Effect of Amalgamation on the Single Potentials of the Binary Alloys of Aluminum with Copper, Zinc, and Nickel," Trans. Am. Electrochem. Soc., vol. 36 (1919), pp. 289–303 relied on.

L. DEWAYNE RUTLEDGE, Primary Examiner

E. L. WEISE, Assistant Examiner

U.S. Cl. X.R.

75—134C, 134F, 134N, 169